United States Patent
Amron

(10) Patent No.: US 9,019,074 B1
(45) Date of Patent: Apr. 28, 2015

(54) SYSTEM AND METHOD FOR ALLOCATING ACCESS AT EVENTS

(75) Inventor: Alan Amron, Boca Raton, FL (US)

(73) Assignee: Ecredentials, Miami Beach, FL (US)

( * ) Notice: Subject to any disclaimer, the term of this patent is extended or adjusted under 35 U.S.C. 154(b) by 0 days.

(21) Appl. No.: 13/196,342

(22) Filed: Aug. 2, 2011

(51) Int. Cl.
*G05B 19/00* (2006.01)
*G06K 7/10* (2006.01)
*G06K 5/00* (2006.01)

(52) U.S. Cl.
CPC .............. *G06K 7/10366* (2013.01); *G06K 5/00* (2013.01)

(58) Field of Classification Search
USPC ......... 340/5.65, 5.64, 5.2, 12.5; 235/380, 375
See application file for complete search history.

(56) References Cited

U.S. PATENT DOCUMENTS

| | | | |
|---|---|---|---|
| 6,965,914 B2 * | 11/2005 | Dowling | 709/203 |
| 6,999,936 B2 * | 2/2006 | Sehr | 705/5 |
| 7,076,522 B2 * | 7/2006 | Chino et al. | 709/203 |
| 7,251,476 B2 * | 7/2007 | Cortegiano | 455/412.1 |
| 8,005,426 B2 * | 8/2011 | Huomo et al. | 455/41.2 |
| 8,267,314 B2 * | 9/2012 | Ishibashi et al. | 235/380 |
| 2003/0105641 A1 * | 6/2003 | Lewis | 705/1 |
| 2006/0205490 A1 * | 9/2006 | Huber | 463/29 |
| 2007/0156443 A1 * | 7/2007 | Gurvey | 705/1 |

* cited by examiner

*Primary Examiner* — Vernal Brown
(74) *Attorney, Agent, or Firm* — Cozen O'Connor

(57) ABSTRACT

A credential management system which obviates the need to design, produce and distribute one-time printed passes to individuals authorized to be present at an event such, for example, as cast members, stage crew, security details and staff, important guests, performers, players, officials and many others. Electronic credential passes are distributed to invitees of an events such as a sporting event, a concert, a large social gathering, or filming of a movie or TV show. Each reusable pass is operative to display an image containing indicia representative of an event descriptor and an access level descriptor, whereby one can quickly and easily ascertain whether an individual seeking access to a particular area, during an event, is in fact authorized to do so. Optionally, the image displayed by each reusable pass can further include a photo of the bearer, a UPC bar code, and one or more logos corresponding to event sponsors.

22 Claims, 3 Drawing Sheets

SYSTEM AND METHOD FOR ALLOCATING ACCESS AT EVENTS

BACKGROUND OF THE INVENTION

1. Field of the Invention

The present invention relates generally to systems and techniques for distinguishing between authorized and unauthorized individuals and, more particularly, to the distribution and presentation of articles having visible indicia thereon to establish the authorized status of individuals seeking access to an area or event.

2. Discussion of the Background Art

There are many situations where it is necessary to distinguish between those individuals with permission to enter a particular area or building. Where the number of individuals to be recognized is relatively small, the turnover among them is low, and the security workforce stable, it may be possible to rely solely on recognition of each individual based on their physical appearance (i.e., "by sight"). Where the number of individuals having authority to enter secure areas and/or facilities is too large or is subject to a higher rate of turnover, or where the security staff itself is subject to turnover, however, it is not feasible to rely upon recognizing individuals by sight alone. It has therefore become commonplace to rely upon such identification systems as wearable badges in conjunction with a method of uniquely associating each badge with the individual wearing it. Frequently, the method for associating the badge with the individual wearing it includes a photograph, a signature, a fingerprint, an RFID tag, or even some combination of these. Specially designed doors equipped to admit only one person at a time, and only upon recognition of an appropriate code (whether by keypad entry, passive RFID detection, biometric scanning, etc.) are also commonplace.

While the aforementioned identification systems are now ubiquitous in the workplace, there are certain limitations which make them unsuitable for certain situations such, for example, as where one or more groups of individuals have only a transient need to enter a specific building, facility, or area thereof. By way of illustration, a professional football team may play eighteen games, with half of these being at a local or "home" stadium and the other half of the games being "away games" played at the home stadium of an adversary. A professional baseball team may play almost ten times as many games as a football team, but with a similar distribution of local and away games. In each of these cases, there are team members, supporting staff and other employees that all require a way of documenting their authority to enter a stadium on the day of an event (whether it be a practice session, a pre-season game, a regular season game, or a post season game). A musician or band may play at a large number of venues during a single tour, while a movie or television show may require filming at a number of different locations, with a concert or filming session at each discrete location also constituting an "event".

In all of the foregoing situations, it has been customary to issue individuals who are authorized to be present at an event—whether they are attending as a member of the audience or in a supporting capacity—a discrete, temporary printed admission pass good only for the day of the event, after which it is to be discarded and cannot be used for admission to a subsequent event. The printed passes are expensive to produce, and each must be distributed to every authorized individual at some point prior to the applicable event(s). As the number of individuals with a need or desire to be present at multiple events grows, the cost and inefficiency of the approach quickly becomes apparent. While it would be possible to print and distribute a multiple use pass, the risk of unauthorized duplication and/or use, already quite high, increases dramatically.

A need therefore exists for a credential management system which obviates the need to design, produce and distribute one-time printed passes to individuals authorized to be present at an event such, for example, as cast members, stage crew, security details and staff, important guests, performers, players, officials and many others.

A further need exists for a credential management system which minimizes the risks of unauthorized use or duplication.

Still another need exists for a credential management system having an optional location tracking capability whereby the whereabouts of each person to whom a reusable pass is issued can be remotely monitored during an event.

SUMMARY OF THE INVENTION

The aforementioned needs are addressed, and an advance is made in the art, by a system for allocating access privileges to event invitees which comprises a plurality of reusable passes, with each pass including a processor, a memory, a communication interface, and an electronic display. The system further includes a credential management system that is operative to store at least one event descriptor and at least one access level descriptor. Each of the reusable passes is responsive to information received from the credential management system to display an image that contains indicia representative of the event descriptor and the first access level descriptor.

For purposes of the present disclosure, the phrase "event descriptor" is intended to include the identity of a musician or band, the identities of individual athletes competing in a match, the identities of sports teams competing in a game, the identity of a film studio, production company, or designation of a movie or television show being filmed, and, optionally, the date of the performance, match, game, or filming session as the case may be.

The phrase "access level descriptor" is intended to encompass the capacity in which the wearer of the pass is attending the event. By way of illustrative example, the access level descriptor may take the form of a logo or corporate identifier signifying the employer of the wearer—as in the case of a television network or a professional sports organization (e.g., "FOX" or "NFL"), the role of the wearer (e.g. "STAFF", "SECURITY", etc.), the status of the wearer ("VIP"), or the area(s) to which the wearer is permitted access if less than full access is contemplated (e.g., a stadium skybox or a specific assigned seat).

In accordance with a modified embodiment of the invention, each reusable pass further includes a respective global positioning satellite (GPS) receiver operative to obtain location data and a corresponding wireless network transceiver for establishing a telecommunications link with a network node, whereby identifying data and position data from each reusable pass can be transmitted to a remote monitoring station for tracking the whereabouts of each reusable pass during an event. By way of illustrative example, the wireless network transceiver may be a cellular network transceiver and the network nodes may be base stations of a cellular network. Advantageously, the location and identification data may be relayed to the remote monitoring station in the form of an SMS or MMS message.

A method for allocating access privileges to event invitees comprises operating a credential management system to store an event descriptor and an access level descriptor applicable to a group of individuals eligible to be present at an event identified by the event descriptor. A reusable pass distributed to a plurality of the event invitees includes a communication interface, a memory, a processor, and an electronic display under the control of the processor. Information representative of the event descriptor and access level descriptor are received at the communication interface of each reusable pass. The method further includes displaying, on a reusable pass worn by a first member of the group of individuals eligible to be present at an event identified by the event descriptor, an image containing indicia representative of the event descriptor and the first access level descriptor.

In accordance with an illustrative embodiment of the invention, the credential management system and reusable badges are programmed to establish two or more levels of access privileges. To this end, the credential management system is operated to store first and second access level descriptors, wherein each communication interface of a first group of reusable passes receives information representative of the event descriptor and a first access level descriptor and each communication interface of a second group of reusable passes receives information representative of the event descriptor and a second access level descriptor. By way of illustration, the first access level descriptor is representative of the role of each member of a first group of pass wearers and the second access level descriptor is representative of the areas of a facility to which members of the second group of pass wearers are to be permitted access. By way of alternate illustration, the first access level descriptor is representative of the employer of each member of a first group of pass wearers and the second access level descriptor is representative of the status of each member of a second group of pass wearers.

In a modified embodiment of the present invention, the credential management system is operated to store a plurality of sponsor logos in association with the event identified by the event descriptor. Information corresponding to the logo(s) of one or more event sponsor is received by a plurality of the reusable passes, and an image containing indicia representative of the event descriptor, the access level descriptor, and at least one of the plurality of sponsor logos is displayed. In accordance with a first illustrative example of the modified embodiment, a plurality of logos are pre-stored in each pass and the associated communication interface receives an instruction to display a sequence of logos in a prescribed order and synchronously with other passes identified by a common access level descriptor, whereby a member of an event's security detail can assess whether the pass is an authorized device. In accordance with an alternative example of the modified embodiment, the communication interface is a wireless interface and each pass receives an instruction to display a sequence of logos in a random manner but synchronously with other passes identified by a common access level descriptor.

In a modified embodiment of the present invention, the credential management system is operated to store a plurality of UPC symbols each associated with a corresponding individual to whom a pass may be issued, and to store personal data to be used in validating the authorization of each such individual to receive a respective pass. An instruction to display a respective UPC symbol is received by each corresponding pass, and an image containing indicia representative of the event descriptor, the access level descriptor, and at the corresponding UPC symbol is displayed is displayed by each pass.

Reuse of a pass is accommodated by updating the event descriptor and/or the access level descriptor, in advance of the next event at which it will be used. The pass may either remain in the possession of the individual to which it is initially issued, or it may be collected at the conclusion of each event. In the former case, the pass may be configured with a log-in screen and a USB, Bluetooth, Wi-Fi or other wireless network interface to permit remote updating at the initiation of an authorized user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Like reference numerals indicate like elements in the drawings. Unless otherwise indicated, elements are not drawn to scale.

DETAILED DESCRIPTION

Figure 1:
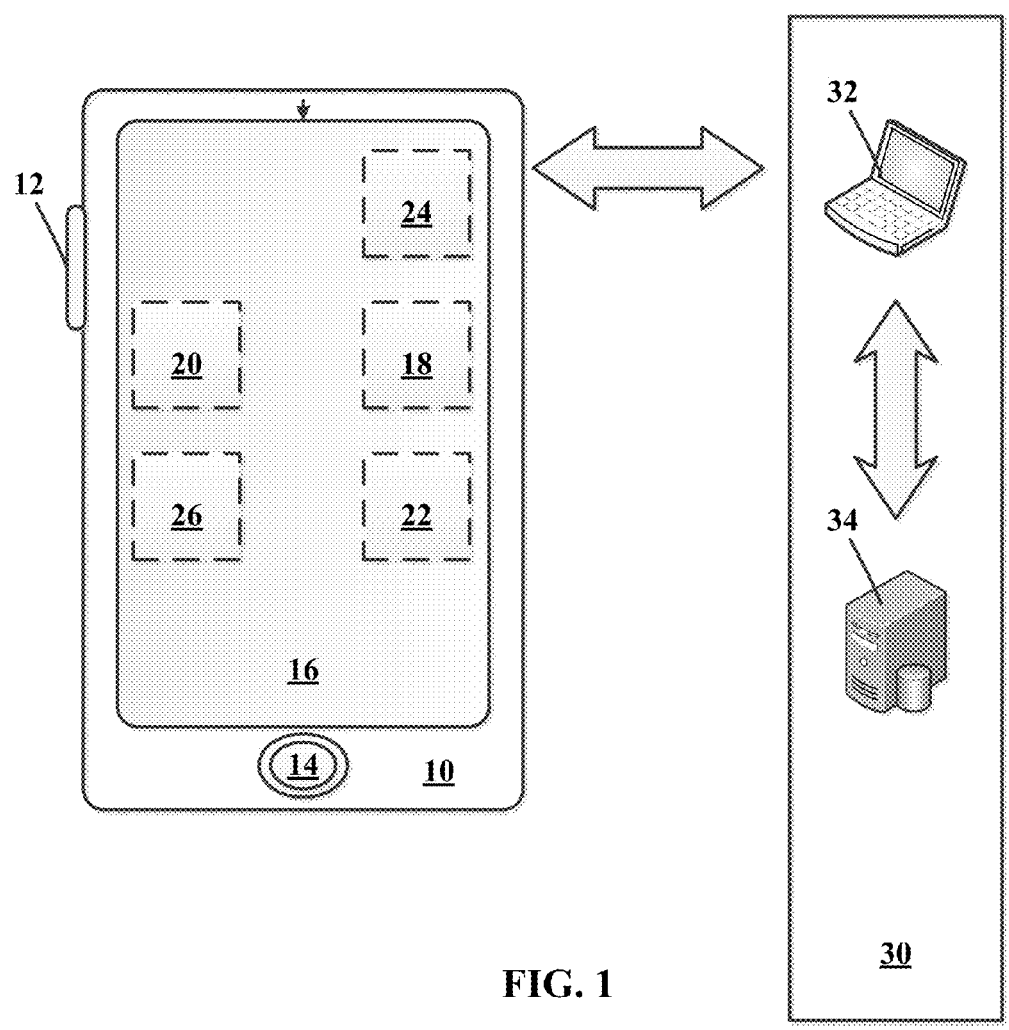
FIG. 1 is a schematic representation of the elements of an access allocation system constructed in accordance with an illustrative embodiment of the present invention, the system including a pass, one or more administrator workstations, and a database server.

With initial reference to FIG. 1, there is shown an access allocation system constructed in accordance with an illustrative embodiment of the present invention, the system including a plurality of wearable, reusable passes (only one of which, indicated generally at reference numeral 10 is shown), and a credential management system indicated generally at reference numeral 30. Each wearable electronic pass as pass 10 is preferably worn on a lanyard (not shown) so that it can be seen easily and quickly at a glance by security staff during an event. It will be readily appreciated, however, that other provisions may be made to accommodate wearing of the passes including, for example, the inclusion of a clip structure (not shown) for securing pass 10 to the clothing of a user.

In any event, and with continuing reference to FIG. 1, it will be seen that pass 10 includes an on/off slide switch 12 for energizing and de-energizing pass 10, and optionally, a display screen select pushbutton indicated generally at 14 for allowing the user to toggle between a first image displayed on display 16, and one or more additional images. Exemplary uses of such a toggling capability will be described in greater detail shortly. For now, it suffices to say that user controls such as pushbutton 16 may be incorporated to enable a user to scroll through menus, control the brightness of display or otherwise invoke the functions of pass 10. Alternatively, of course, such user input capability may be omitted altogether in situations where it is deemed unnecessary or undesirable to enable the user to control the operation of pass 10.

Within the housing of each pass 10 is disposed a processor 18, a memory 20 for storing the operating system and application software for driving the various functions of pass 10, a display screen controller 22, and a communication interface 24. In the illustrative embodiment of FIG. 1, pass 10 further includes an optional global positioning satellite receiver indicated generally at 26. Power for the aforementioned components is supplied by an internal battery (not shown).

Display screen 16 is of sufficient size to display text and graphics in an easily viewable manner. In the illustrative embodiment of FIG. 1, display screen 16 is an LCD screen, such as a TFT or OLED screen. A primary purpose of communication interface 24 is to receive information from credential management system 30. To this end, communication interface 24 may comprise a USB connection, a wireless transceiver such as an IEEE 802.11, a Bluetooth wireless, an infra-red, or a cellular network transceiver, or any other link as appropriate.

With continuing reference to the illustrative embodiment of FIG. 1, it will be seen that credential management 30 comprises one or more administrator workstations (only one of which, indicated generally at reference numeral 32, is shown) adapted to exchange information with each pass as pass 10 via a communication interface (not shown). While it is contemplated by the inventor herein that an administrator workstation as workstation 32 may have stored in local memory all of the information needed to validate and upload the appropriate data to each pass, FIG. 1 depicts an arrangement in which a single database hosted at a remotely situated server 34 is employed. Such an arrangement is advantageous in that it allows information relating to many individual users to be stored and updated at a centralized office location, while the administrator workstations may be distributed at various entrances of a building or facility. In accordance with an illustrative embodiment of the present invention, the database of server 34 contains, for each event to be supported, a plurality of event records wherein each event record includes identifying information for a corresponding individual, one or more event descriptors associated with the event(s) to which an individual is to have access, and an access level descriptor.

By way of example, the identifying information for a given individual may include one or more of the following: the name, gender, age, telephone number, driver's license number and issuing jurisdiction, a photograph, a fingerprint or other biometric identifier, and a UPC code that has been pre-assigned to the individual. Each event descriptor may include a designation of one or more of the following: the name of the event (e.g., a particular match or game between individual athletes or group of athletes, a musician or band giving a concert), the sponsor(s) or host(s) of the event (e.g., the host of a large social gathering), the location of the event (e.g., a particular stadium, arena, building, field, or other facility), the purpose of the event, and the date of the event (if, for example, there will be multiple occurrences at a single location or facility). Examples of access level descriptors include a designation of the role of an individual (staff, security detail, performer, office personnel), a designation of the areas of a facility to which an individual is authorized to enter and be present, a designation of an individual's status (e.g., "V.I.P." or "Guest"), and a designation of a company with which an individual is affiliated or by which an individual is employed (e.g., a professional athletic organization, a television or radio network or other media outlet, a press agency, or an event sponsor).

As will be readily ascertained by those skilled in the art, it is necessary to download information corresponding to the appropriate event and access level descriptors to a pass before it can be used by an individual to gain admission to and/or move about permitted areas during an event. Such a transfer is achieved, in a conventional manner, via communication interface 24 of pass 10 and a corresponding communication interface (not shown) of credential management system 32.

Figure 2:
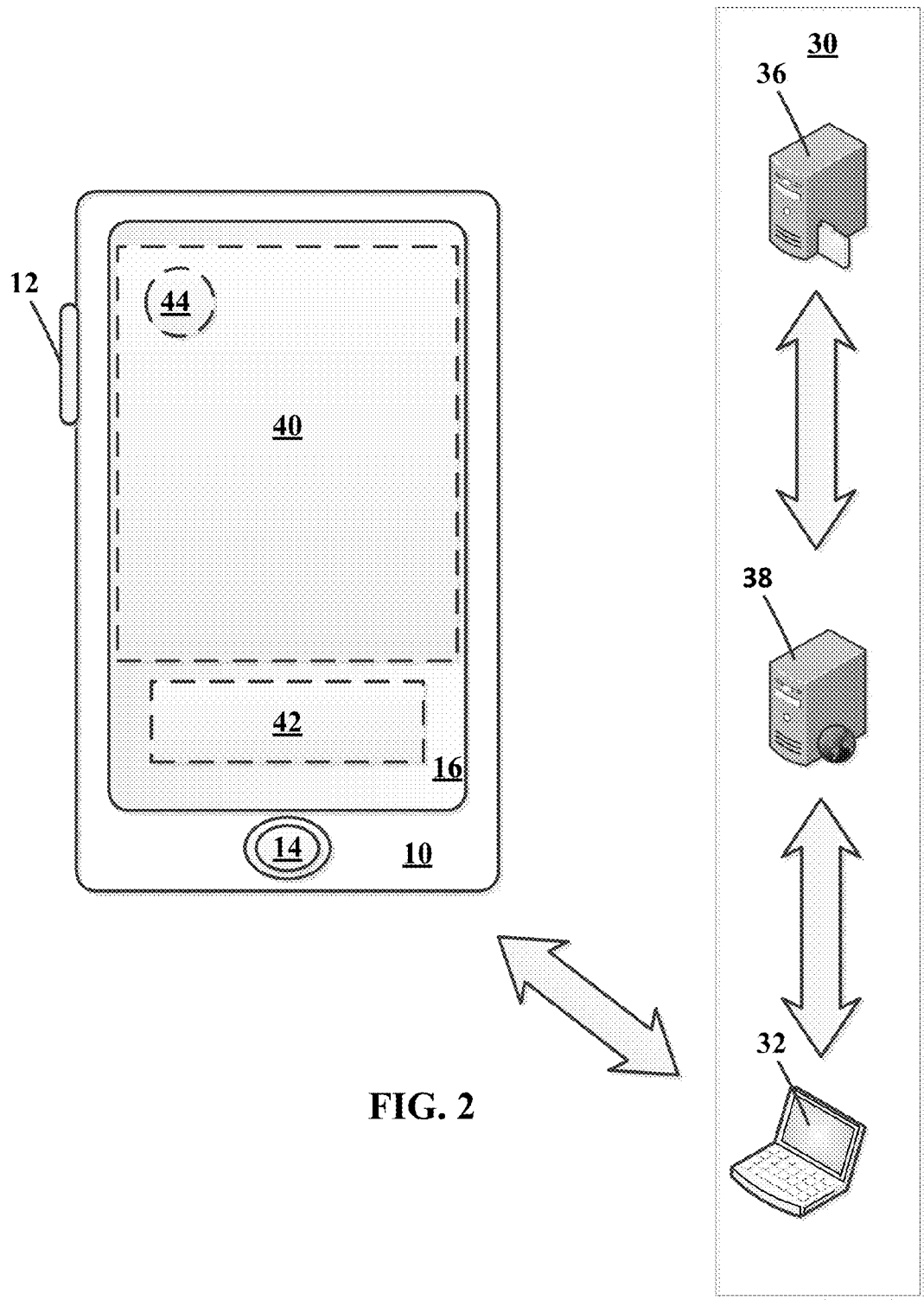
FIG. 2 is a perspective view depicting an alternate embodiment of an access system constructed in accordance with the present invention, and exemplifying the display of image containing an event descriptor, an access level descriptor, and an additional image field such as a corporate logo.

Turning now to FIG. 2, a slightly modified access allocation system, in which credential management system 30 includes, in addition to workstation 32, a file server 36 and web server 38 whereby the administrative functions of creating and modifying event records can still be performed locally at workstations as workstation 32 distributed at a number of geographically distributed facilities, but the storage and back-up functions are handled on a remote, centralized basis. It will be further seen that display 16 of pass 10 is operative to display an image containing indicia representative of the event descriptor, indicated generally at reference numeral 40, indicia representative of the access level descriptor, indicated generally at reference numeral 42, and optionally, indicia 44 representative of a corporate logo, an assigned seat or seating area, and/or special areas to which only certain individuals are to be admitted. Illustratively, the indicia representative of the event descriptor may comprise text, graphic artwork, or some combination thereof. To render the image visible even in settings of low ambient light, operating software within pass 10 is preferably configured to operate a light source (not shown) to ensure that display 16 is backlit for at least the duration of an applicable event.

Returning briefly to FIG. 1, it will be recalled that the inventor herein contemplates that exemplary embodiments of pass 10 may be configured with a GPS receiver and application software executable to use GPS position data, in a conventional manner, to establish its location in three dimensional space. Such position data may be transmitted, via communication interface 24, either to a cellular communications network (if pass 10 is equipped with a suitable transceiver). Alternatively, pass 10 may be equipped with an RF transponder beacon (not shown) whereby the location of each pass wearer can be established by a plurality of RF receivers or transceivers in accordance with conventional triangulation techniques. Moreover, pushbutton 12 may be actuated so as to cause the image displayed on screen 16 to toggle between primary event credentials images (that includes indicia designating an event descriptor and corresponding access level descriptor), and one or more secondary images which may include, for example, a map display of a facility and the user's location within it and/or a text message display corresponding to a page of the user received via communication interface 24.

For added security, and to prevent unauthorized users from duplicating a primary credentials image being displayed, each pass as pass 10 in use during a particular event may be programmed, via workstation 32, to synchronously display on display screen 16 a specific visible sequence of sponsor logos or other indicia. The timing between such indicia may be varied to further limit opportunities for unauthorized reproduction. By way of alternate example, instructions to synchronously display a particular logo or other indicia—along with an image of the indicia itself—may be sent wirelessly to communication interface 24 of each pass during the event. It suffices to say that with such synchronized operation, the members of a facility's or event's security detail can readily ascertain, at a glance, whether an individual is wearing an authentic pass as pass 16 or merely an unauthorized duplicate.

Figure 3:
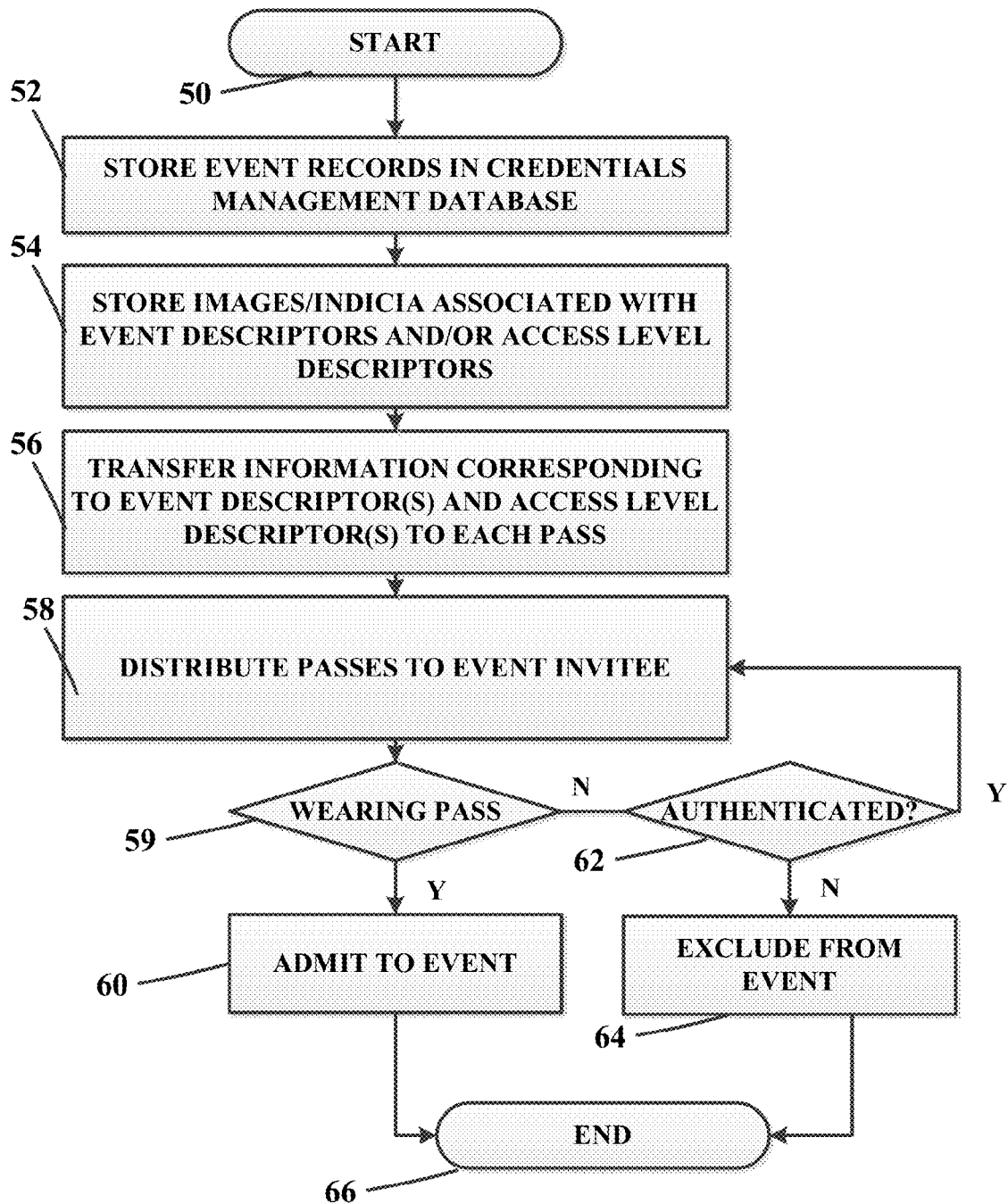
FIG. 3 is a flow chart depicting an illustrative sequence of operation for the illustrative embodiment shown in FIG. 2.

With reference now to FIG. 3, there is illustrated an exemplary process for operating a credential management system in accordance with the principles of the present invention. The process is entered at start block 50 and proceeds to block 52, at which event records are created, transferred, or otherwise stored in a credential management system (CMS) database. The event records include information for authenticating individuals to who are to gain admission to an event and/or access to particular areas of a facility, to which individuals a credentials pass will be issued in accordance with the present invention, as well, one or more event descriptors designating an event or facility to which individuals wearing a credentials pass are to be admitted, and one or more access level descriptors associated with each individual. At block 54, any images or indicia an event organizer wishes to associate with a particular event descriptor or access level descriptor is transferred or uploaded to, or stored within a CMS workstation or database. At block 56, information representative of the event descriptor and access level descriptor, which may include any uploaded images and indicia associated therewith, are uploaded to a plurality of credentials passes to be issued at an individual. Other information, such as respective photos, fingerprints, or UPC symbols unique to each corresponding individual may be uploaded at this time. At block 58, passes are distributed to designated individuals, and at decision block 59, a decision is made to whether an individual is wearing a pass or not. If yes, the process proceeds to step 60, whereupon the individual is admitted to the event. If no, the process proceeds to decision block 62, whereupon a determination is made whether the individual can be authenticated based, for example, upon information contained in the event records database. If yes, the process reverts to block 58 and a properly configured pass is distributed to the user. If no, then the process proceeds to block 64 and the individual is denied entry to the event or admission to particular area within the facility at which the event is being held. At the conclusion of an event, the credentials passes may either be returned or retained, depending upon whether the user may be attending future events. The process terminates at termination block 66.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    responsive to operation of a credential management system to store an event descriptor and a first access level descriptor applicable to a first group of individuals eligible to attend an event identified by the event descriptor,
    receiving, via a communication interface of a first reusable badge having a memory, a processor and an electronic display, information representative of the event descriptor and the first access level descriptor, the first reusable badge being wearable by a first member of the first group of individuals;
    in a first displaying step, displaying on the display of the first reusable badge, a visible image containing indicia representative of the event descriptor and the first access level descriptor while the first reusable badge is being one of carried or worn by the first member of the first group of individuals;
    in a second displaying step, displaying on the display of the first reusable badge, a first supplemental indicia for the duration of an initial interval of time; and
    in a third displaying step, displaying on the display of the first reusable badge, a second supplemental indicia, replacing the first supplemental indicia, for the duration of an interval of time subsequent to the initial interval, wherein each of the first and second supplemental indicia comprises a respective UPC code for which an association exists, in the credential management system, with both an event and the first member for a respectively different time interval coincident with an event identified by the event descriptor.

2. The method of claim 1, further comprising:
    responsive to operation of the credential management system to store a second access level descriptor applicable to a second group of individuals eligible to attend the event identified by the event descriptor,
    receiving, via a communication interface of a second reusable badge having a memory, a processor and an illuminated electronic display, information representative of the event descriptor and the second access level descriptor, the second reusable badge being wearable by a first member of the second group of individuals; and
    in a fourth displaying step, displaying on the second reusable badge, a visible image containing indicia representative of the event descriptor and the second access level descriptor while the first reusable badge is being one of carried or worn by the first member of the first group of individuals.

3. The method of claim 2, wherein the first group of individuals eligible to attend the event comprises individuals having a potential need to enter locations from which other attendees of the event are restricted.

4. The method of claim 3, wherein the indicia representative of the first access level descriptor includes one of the words "Staff" and "Crew".

5. The method of claim 2, wherein the second group of individuals eligible to attend the event comprises individuals desiring the ability to enter locations from which other attendees of the event are restricted.

6. The method of claim 5, wherein the indicia representative of the first access level descriptor identifies at least one location to which entry by most other attendees of the event is restricted.

7. The method of claim 2, wherein seats are respectively assigned by the credential management system to corresponding individuals attending the event, the method further including a step of displaying, on a reusable badge worn by a corresponding individual attending the event, an image containing indicia representative of the event descriptor and a respective assigned seat.

8. The method of claim 2, further comprising a step of operating the display of the first reusable badge so as to toggle between display of the visible image containing indicia representative of the event descriptor and the first access level descriptor and display of the first member's position location on a facility map.

9. The method of claim 2, wherein the event is one of an athletic event, a musical performance, or a gathering attended by invitees.

10. The method of claim 1, wherein the first group of individuals eligible to be attend the event comprises individuals having a potential need to enter locations from which at least some attendees of the event are restricted.

11. The method of claim 1, wherein the first group of individuals eligible to be attend the event comprises individuals desiring the ability to enter locations from which at least some attendees of the event are restricted.

12. The method of claim 11, wherein the visible indicia representative of the first access level descriptor and displayed during the first displaying step identifies at least one location to which entry by most other attendees of the event is prohibited.

13. The method of claim 1, further including, responsive to assignment of respective seats to corresponding individuals attending the event, a step of displaying, on a reusable badge worn by a corresponding individual attending the event, an image containing indicia representative of the event descriptor and a respective assigned seat.

14. The method claim 1, wherein the initial and subsequent intervals are not equal in duration.

15. The method of claim 14, wherein each of the first and second supplemental indicia further comprises respective corporate logos associated with corresponding event sponsors, and wherein all reusable badges programmed for use at a selected event are configurable by the credential management system to display the same logo synchronously during the event identified by the event descriptor.

16. The method of claim 15, wherein each reusable badge displays a common sponsor logo for the duration of a selectable interval.

17. The method of claim 16, further comprising a step of admitting to at least one area during an event, only individuals wearing a reusable badge displaying the event descriptor, the first access level descriptor, and the sponsor logo corresponding to the applicable time interval, and preventing entry of at least some other event attendees.

18. The method of claim 1, further including receiving, via a communication interface of each reusable badge worn by a member of the first group of individuals eligible to attend the event identified by the event descriptor, information specifying a respective UPC bar code and a corresponding time interval during which each UPC code is to be displayed.

19. The method of claim 18, further including a step of displaying, on each reusable badge worn by a member of the first group of individuals at an event identified by the event descriptor, an image containing each of the event descriptor, the first access level descriptor, and a respective UPC bar code.

20. The method of claim 1, further comprising:
   displaying, on each reusable badge worn by a respective member of the first group of individuals at an event identified by the event descriptor, an image containing each of the event descriptor, the first access level descriptor, an image of said respective member, and a UPC bar code applicable to a current time interval.

21. A system for allocating levels of access privileges among event attendees, comprising:
   a plurality of reusable passes, each pass comprising a processor, a memory, a communication interface, and an electronic display; and
   a credential management system, said credential management system being configured to store at least one event descriptor and at least one access level descriptor, the credential management system being further configured
      to assign a respective plurality of different UPC symbols to each of the plurality of reusable passes,
      to associate a first assigned UPC symbol of each plurality with a first pass of the plurality of passes during a first time interval coincident with an event designated by the at least one event descriptor; and
      to associate a second assigned UPC symbol with the first pass during a second time interval coincident with the event designated by the at least one event descriptor;
   wherein the first pass is responsive to information received from the credential management to display an image containing indicia representative of the event descriptor and the first access level descriptor, and
   wherein the first pass is further responsive to information received from the credential management system to display the first assigned UPC symbol for the duration of the first time interval and to display the second assigned UPC symbol, as a replacement for the first assigned UPC symbol, for the duration of the second time interval.

22. The system according to claim 21, wherein each reusable pass further includes a respective global positioning satellite (GPS) receiver operative to obtain positional data and a corresponding network transceiver for establishing a telecommunication link with a cellular network to thereby transmit position data for monitoring a location of each reusable pass during an event.

* * * * *